United States Patent [19]
Okazaki

[11] Patent Number: 5,944,158
[45] Date of Patent: Aug. 31, 1999

[54] ELECTROMAGNETIC CLUTCH

[75] Inventor: Michio Okazaki, Kawasato-mura, Japan

[73] Assignee: Zexel Corporation, Tokyo, Japan

[21] Appl. No.: 08/944,731

[22] Filed: Oct. 6, 1997

[30] Foreign Application Priority Data

Oct. 11, 1996 [JP] Japan ................................. 8-289331

[51] Int. Cl.⁶ ............................ F16D 19/00; F16D 27/00; F16D 37/02
[52] U.S. Cl. ................................... 192/84.96; 192/84.961
[58] Field of Search ........................... 192/84.961, 84.96

[56] References Cited

U.S. PATENT DOCUMENTS

| | | | |
|---|---|---|---|
| 4,227,600 | 10/1980 | Shirai | 192/84.961 |
| 4,445,606 | 5/1984 | VanLaningham | 192/84.961 |
| 5,138,293 | 8/1992 | Ishimaru | 192/84.961 |
| 5,372,228 | 12/1994 | VanLaningham et al. | 192/84.961 |
| 5,642,798 | 7/1997 | Muirhead et al. | 192/84.961 |

*Primary Examiner*—Charles A. Marmor
*Assistant Examiner*—Tisha D. Waddell

*Attorney, Agent, or Firm*—Frishauf, Holtz, Goodman, Langer & Chick, P.C.

[57] ABSTRACT

There is provided an electromagnetic clutch which is capable of reducing a variation in torque (reaction force) from a refrigerant compressor. The electromagnetic clutch includes a hub rigidly fitted on a drive shaft, the hub having a flange portion, a rotor which rotates about the drive shaft, a magnetic coil arranged within the rotor, an armature plate which is attracted into abutment with the rotor when the magnetic coil is energized, and a plurality of spring members interposed between the flange portion of the hub and the armature plate along a circumference of the rotor, for connection between the flange portion of the hub and the armature plate. The armature plate comprises a rotor-side annular disk axially opposed to the rotor with a predetermined axial gap therebetween, a spring-side annular disk arranged on a spring member side of the rotor-side disk in a manner axially opposed to the rotor-side annular disk, and an elastic body interposed between the rotor-side annular disk and the spring-side annular disk in a manner such that the elastic body is joined to the rotor-side annular disk and the spring-side annular disk.

6 Claims, 7 Drawing Sheets

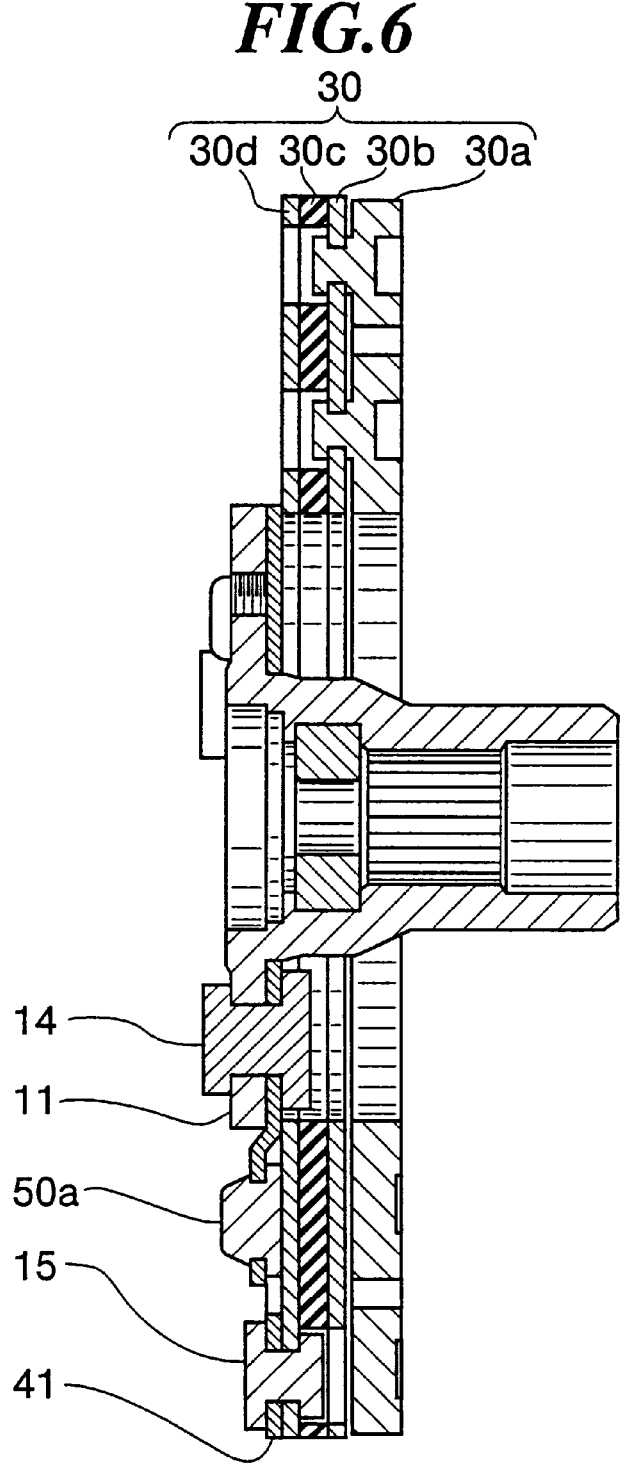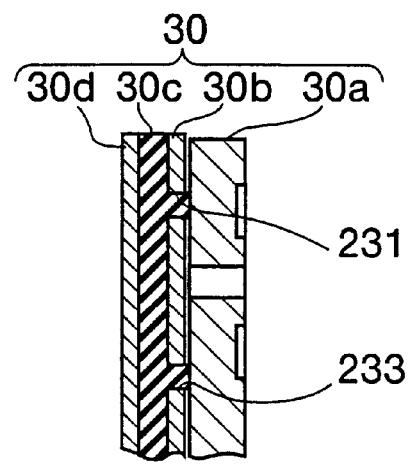

ELECTROMAGNETIC CLUTCH

BACKGROUND OF THE INVENTION

1. Field of the Invention

This invention relates to an electromagnetic clutch, and more particularly to an electromagnetic clutch for transmitting driving force from a drive source to a drive shaft of a refrigerant compressor.

2. Description of the Prior Art

FIG. 1 is a perspective view, partly in section, of a conventional electromagnetic clutch.

The electromagnetic clutch 300 includes a hub 310 having a flange portion 311 and rigidly fitted on a drive shaft 302 of a refrigerant compressor, a rotor 320 driven by torque from an engine (not shown) for rotation about the drive shaft 302, an armature plate 330 which is magnetically attracted into abutment with the rotor 320 when a magnetic coil 321 arranged in the rotor 320 is energized, and three leaf springs 340 interposed between the flange portion 311 of the hub 310 and the armature plate 330 for returning the armature plate 330 to its off position when the magnetic coil 321 is deenergized. The armature plate 330 is comprised of an outer disk 330a and an inner disk 330b joined to an inner periphery of the outer disk 330a via a jointing metal 330c.

The rotor 320 has a pulley groove 360 circumferentially formed in its outer peripheral surface, and a V-belt, not shown, extends around the pulley groove 360, for connecting the rotor 320 to a crankshaft of the engine, not shown.

Rubber stoppers 350a, 350b and 350c are provided respectively between the leaf springs 340 and the inner disk 330b of the armature plate 330 such that they have preloads which prevent rattle.

When the magnetic coil 321 is not energized, the leaf springs 340 having resilient properties hold the armature plate 330 in its off position at a predetermined distance from a friction surface of the rotor 320, whereby driving force of the engine is inhibited from being transmitted to the refrigerant compressor, and hence the rotor 320 rotates in a disconnected state or idles.

On the other hand, when the magnetic coil 321 is energized for generation of electromagnetic force, the armature plate 330 is magnetically attracted into abutment with the friction surface of the rotor 320 against the pulling or returning force of the leaf springs 340, whereby the driving force from the engine is transmitted to the drive shaft 302 of the refrigerant compressor.

According to the above conventional electromagnetic clutch, since the armature plate 330 and the leaf springs 340 are united by rivets 316, 317, a variation in torque generated within the refrigerant compressor (i.e. a variation in reaction force exerted against torque from the engine, which is dependent on load on the compressor and the like) is accommodated by elastic deformation or deflection of the leaf springs 340 having resilient properties. However, when the leaf springs 340 alone are used for the purpose of accommodating the variation in the torque from the refrigerant compressor, the variation in the torque (reaction force) cannot be fully accommodated, depending on rotational speed of the compressor, which can result in a large variation in the torque from the refrigerant compressor.

SUMMARY OF THE INVENTION

It is an object of the invention to provide an electromagnetic clutch which is capable of reducing a variation in torque (reaction force) from a refrigerant compressor.

To attain the above object, the present invention provides an electromagnetic clutch including a hub rigidly fitted on a drive shaft, the hub having a flange portion, a rotor which rotates about the drive shaft, a magnetic coil arranged in the rotor, an armature plate which is magnetically attracted into abutment with the rotor when the magnetic coil is energized, and a plurality of spring members interposed between the flange portion of the hub and the armature plate along a circumference of the rotor, for connection between the flange portion of the hub and the armature plate.

The electromagnetic clutch according to the invention is characterized in that the armature plate comprises:

a rotor-side annular disk axially opposed to the rotor with a predetermined axial gap therebetween;

a spring-side annular disk arranged on a spring member side of the rotor-side annular disk in a manner axially opposed to the rotor-side annular disk; and an elastic body interposed between the rotor-side annular disk and the spring-side annular disk in a manner such that the elastic body is joined to the rotor-side annular disk and the spring-side annular disk.

According to this electromagnetic clutch, the rotor-side annular disk and the spring-side annular disk are joined to each other via the elastic body. Therefore, when the armature plate receives a variation in torque (reaction force) from the compressor, the variation in the torque is accommodated not only by the spring members but also by the elastic body, which makes it possible to reduce the variation in the torque to a much lower level than a level attained by the prior art.

Preferably, the rotor-side annular disk comprises a first annular disk axially opposed to the rotor with the predetermined axial gap therebetween, and a second annular disk connected to the first annular disk in a manner axially opposed to the first annular disk with a predetermined axial gap therebetween, the elastic body being interposed between the second annular disk and the spring-side annular disk in a manner such that the elastic body is axially joined to the second annular disk and the spring-side annular disk.

According to this electromagnetic clutch, when the armature plate is magnetically attracted into abutment with the rotor, the torque from the rotor is transmitted to the first annular disk, the second annular disk, the elastic body, the spring-side annular disk, the spring members, and the flange portion of the hub, in the mentioned order, to cause rotation of the drive shaft of the compressor. Therefore, when the armature plate receives a variation in torque (reaction force) from the compressor, the variation in the torque is accommodated not only by the spring members but also by the elastic body, which makes it possible to reduce the variation in the torque to a much lower level than a level attained by the prior art. Further, heat generated on the armature plate when the armature plate is friction contact with the rotor can be dissipated via the axial gap provided between the first annular disk and the second annular disk, which increases the life of the armature plate.

More preferably, the second annular disk has through holes axially formed therethrough at circumferentially-spaced intervals, through which respective portions of the elastic body are in contact with the first annular disk.

According to the preferred embodiment, when the armature plate is magnetically attracted into abutment with the rotor, the second annular disk applies an impact on the first annular disk via the portions of the elastic body, whereby noise resulting from the attraction of the armature plate can be reduced.

Preferably, the first annular disk has projections formed on a second annular disk-side surface thereof for producing the predetermined axial gap between the first annular disk and the second annular disk.

More preferably, the projections define therein through holes, respectively, which extend axially, the first annular disk and the second annular disk being connected by a plurality of rivets, the rivets extending through the through holes of the projections, respectively.

For example, the elastic body is formed of rubber and joined to the second annular disk and the spring-side annular disk by vulcanizing adhesion.

Preferably, the first annular disk comprises an outer disk, and an inner disk arranged radially inward of the outer disk with a predetermined radial gap therebetween.

According to this preferred embodiment, since the radial gap is provided between the two disks, magnetic flux is prevented from leaking via the rotor and the armature plate, which improves the attraction efficiency of the armature plate.

In another preferred embodiment, the rotor-side annular disk is formed by a single disk, the elastic body being integrally sandwiched between the rotor-side annular disk and the spring-side annular disk.

According to this preferred embodiment, when the armature plate is magnetically attracted into abutment with the rotor, the torque from the rotor is transmitted to the rotor-side annular disk, the elastic body, the spring-side annular disk, the spring members, and the flange portion of the hub, in the mentioned order, to cause rotation of the drive shaft of the compressor. Therefore, when the armature plate receives a variation in torque (reaction force) from the compressor, the variation in the torque is accommodated not only by the spring members but also by the elastic body. Further, according to this construction, the armature plate has only two disks, which makes it possible to reduce the axial length of the electromagnetic clutch.

For example, the elastic body is formed of rubber and joined to the rotor-side annular disk and the spring-side annular disk by baking.

Preferably, the rotor-side annular disk comprises an outer disk, and an inner disk arranged radially inward of the outer disk with a predetermined radial gap therebetween.

The above and other objects, features and advantages of the present invention will become more apparent from the following detailed description taken in conjunction with accompanying drawings.

BRIEF DESCRIPTION OF THE DRAWINGS

FIG. 6 is a cross-sectional view taken on line VI—VI of FIG. 5;

FIG. 7 is a cross-sectional view taken on line VII—VII of FIG. 5;

DETAILED DESCRIPTION OF THE PREFERRED EMBODIMENTS

The invention will now be described in detail with reference to drawings showing preferred embodiments thereof.

Figure 1:
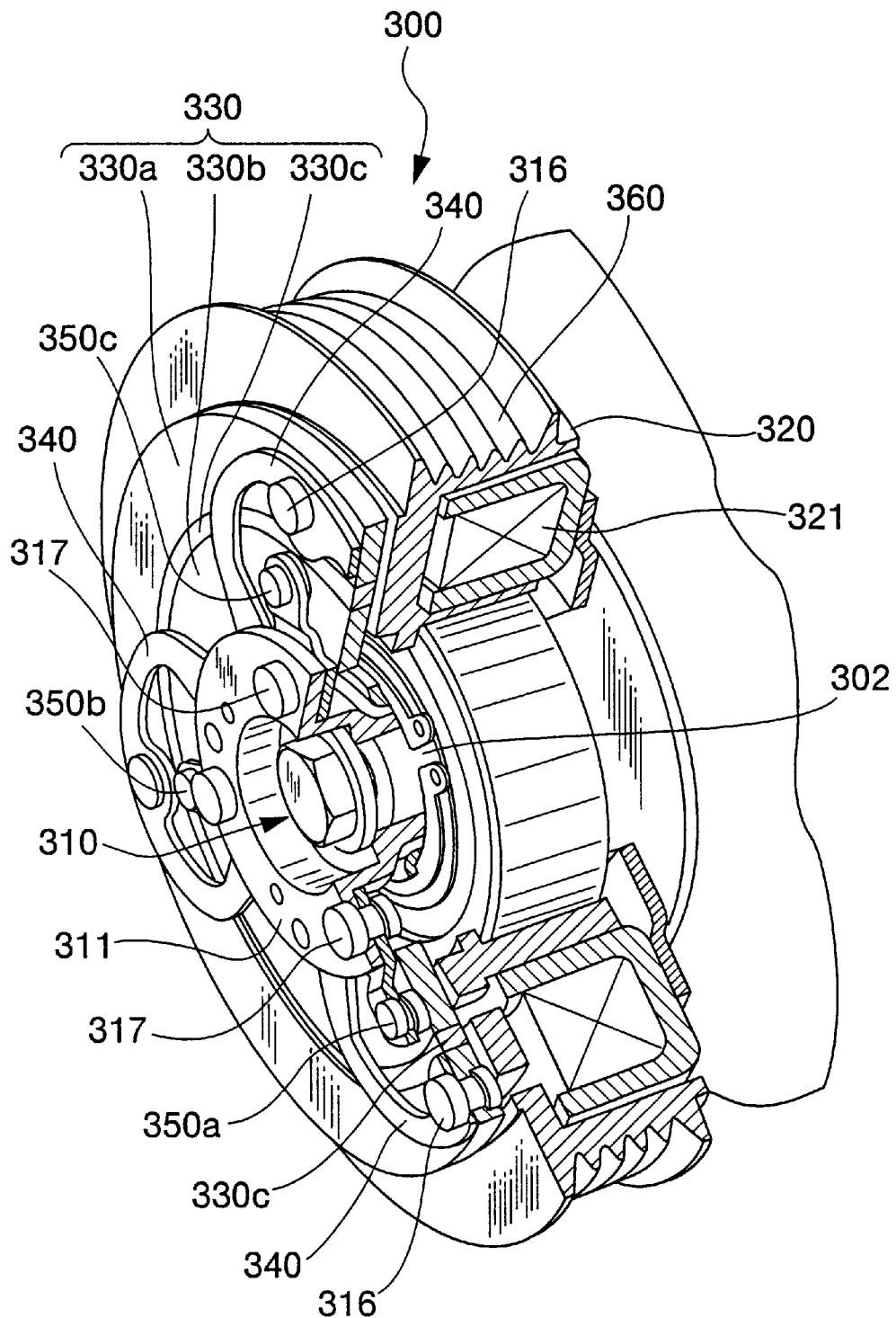
FIG. 1 is a perspective view, partly in section, of a conventional electromagnetic clutch.
Figure 2:
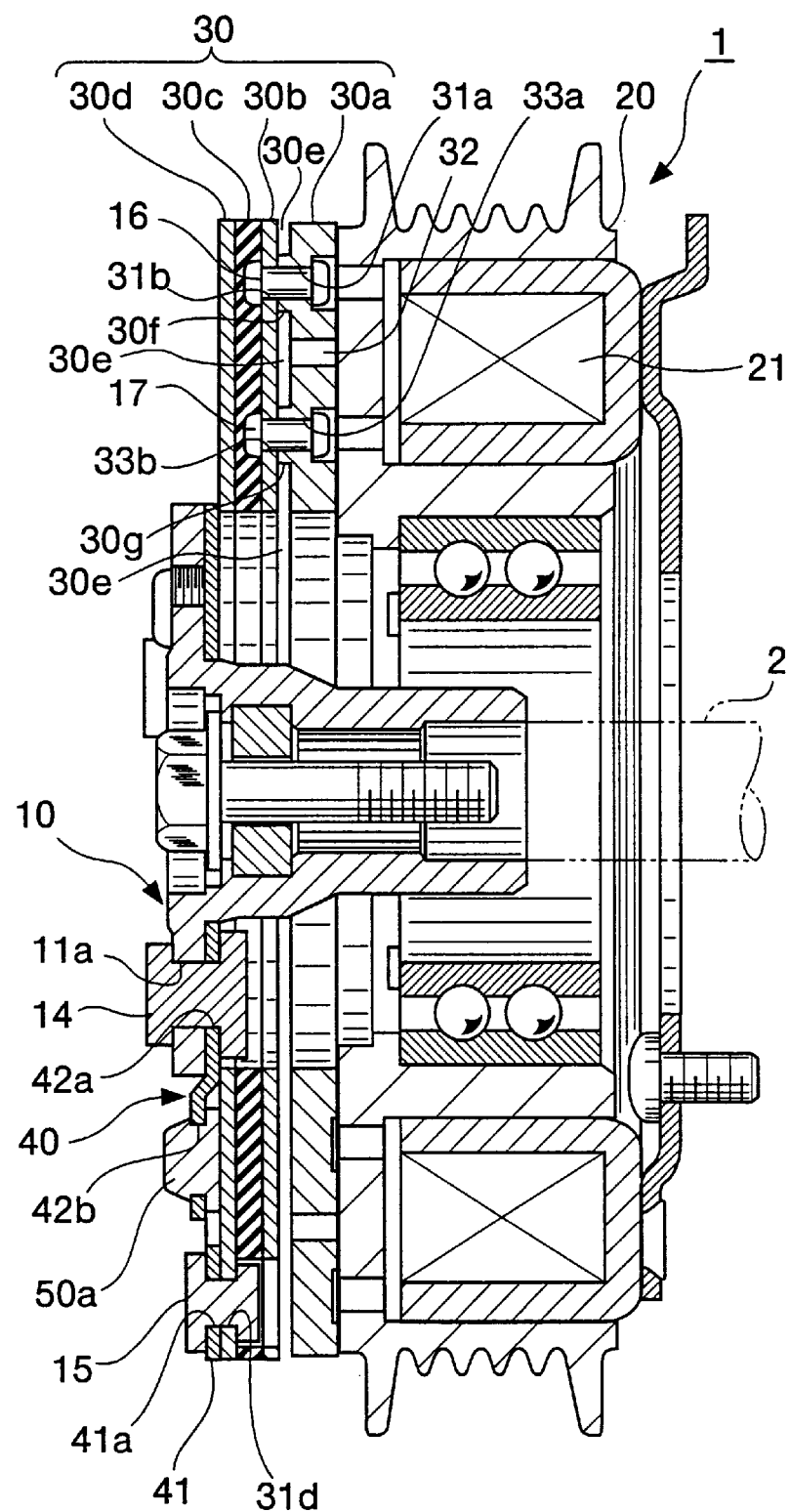
FIG. 2 is a longitudinal cross-sectional view showing the arrangement of an electromagnetic clutch according to a first embodiment of the invention.
Figure 3:
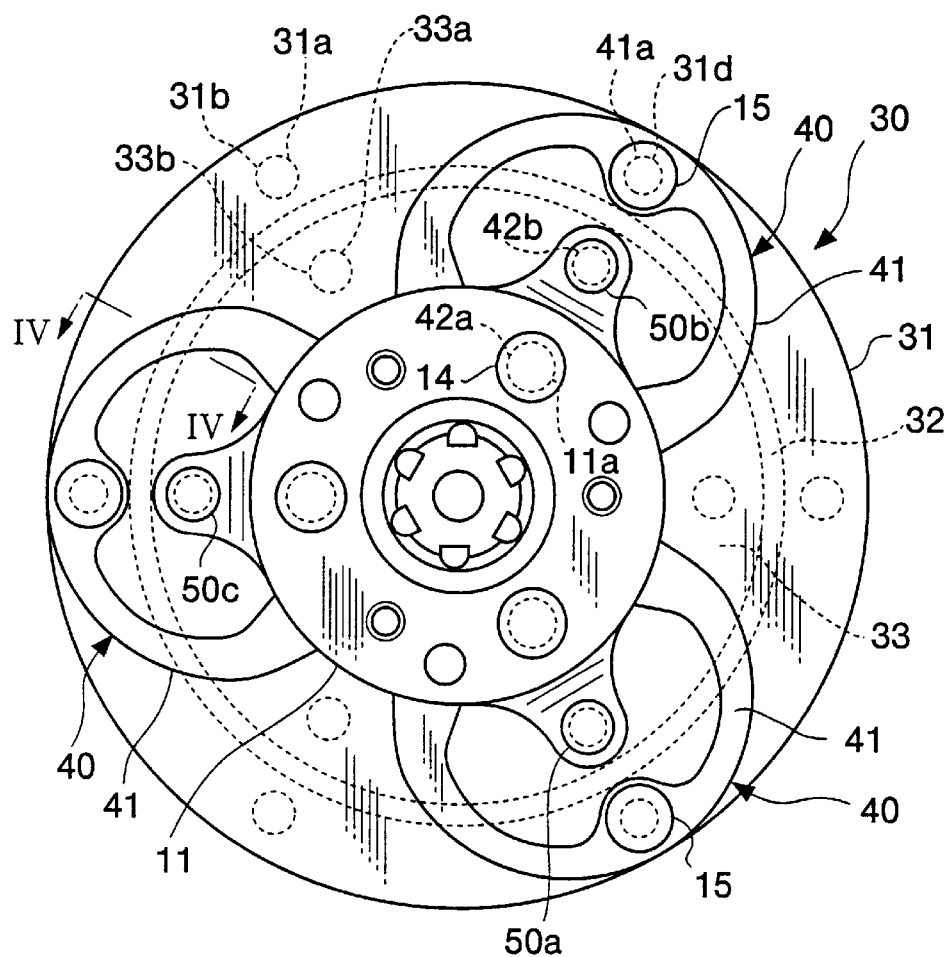
FIG. 3 is a plan view of an armature plate of the FIG. 2 electromagnetic clutch.
Figure 4:
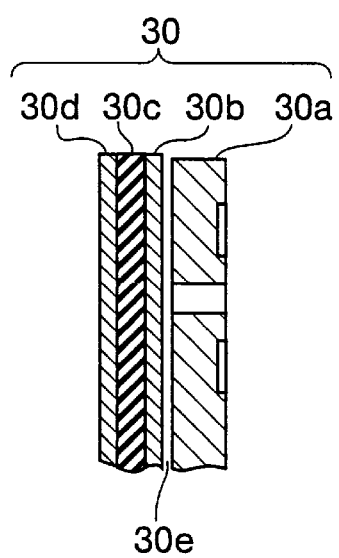
FIG. 4 is a cross-sectional view taken on line IV—IV of FIG. 3.

FIG. 2 is a longitudinal cross-sectional view showing the arrangement of an electromagnetic clutch according to a first embodiment of the invention. FIG. 3 is a plan view of an armature plate of the FIG. 2 electromagnetic clutch, and FIG. 4 a cross-sectional view taken on line IV—IV of FIG. 3.

The electromagnetic clutch 1 includes a hub 10 having a flange portion 11 and rigidly fitted on a drive shaft 2 of a refrigerant compressor, a rotor 20 driven by torque from an engine (not shown) for rotation about the drive shaft 2, an armature plate 30 which is magnetically attracted into abutment with the rotor 20 when a magnetic coil 21 arranged within the rotor 20 is energized, and three leaf springs 40 interposed between the flange portion 11 of the hub 10 and the armature plate 30 for returning the armature plate 30 to its off position when the magnetic coil 21 is deenergized.

The armature plate 30 is comprised of a first annular disk 30a, a second annular disk 30b, an elastic body 30c, and a third annular disk 30d.

The first annular disk 30a, which is comprised of an outer disk 31, and an inner disk 33 arranged radially inward of the outer disk 31 with a radial gap 32 therebetween, is arranged in a manner axially opposed to the rotor 20. The outer disk 31 and the inner disk 33 have through holes 31a and through holes 33a axially formed therethrough, respectively, at angular intervals of 120 degrees about the rotation axis of the electromagnetic clutch (i.e. the common rotation axis of the outer and inner disks 31, 33).

Further, the first annular disk 30a has recesses each formed at a rotor-side end of each through hole 31a or 33a for accommodating a head of each rivet 16 or 17, referred to hereinafter, such that the first annular disk 30a can be brought into surface contact with an end face of the rotor 20 when the armature plate 30 is magnetically attracted into abutment with the rotor 20 (see FIG. 2).

The second annular disk 30b, which has approximately the same radial width as that of the first annular disk 30a (including the outer disk 31, the radial gap 32, and the inner disk 33), is arranged in a manner axially opposed to the first annular disk 30a.

Further, the second annular disk 30b is formed with through holes 31b corresponding respectively to the through holes 31a of the outer disk 31 and through holes 33b corresponding respectively to the through holes 33a of the inner disk 33. The through holes 31b and the through holes 33b are formed at respective angular intervals of 120 degrees about the rotation axis of the second annular disk 30b.

The first annular disk 30a has annular projections 30f and 30g formed on a second annular disk-side end face thereof at respective locations corresponding to the through holes 31b and 33b, for producing an axial gap 30e through which heat generated on the armature plate 30 when the armature plate 30 is in friction contact with the rotor 20 is dissipated. The annular projections 30f and 30g each define therein a through hole continuous with a corresponding one of the through holes 31a and 33a in a manner concentric with a corresponding one of the through holes 31b and 33b of the second annular disk 30b.

Although in the present embodiment the annular projections 30f, 30g are formed on the first annular disk 30a, this is not limitative, but a washer or the like may be interposed between the first annular disk 30a and the second annular disk 30b.

The third annular disk 30d having approximately the same radial width as that of the first annular disk 30a (including the outer disk 31, the radial gap 32 and the inner disk 33) has through holes 31d axially formed therethrough at angular intervals of 120 degrees about the rotation axis thereof (i.e. the rotation axis of the electromagnetic clutch).

The elastic body 30c is formed by a rubber member having substantially the same shape as that of the third annular disk 30d. This rubber member, which is bonded to the second annular disk 30b and the third annular disk 30d by vulcanizing adhesion, is superior to the leaf springs 40 in capability of accommodating the variation in the torque (reaction force) from the refrigerant compressor.

The three leaf springs (spring members) 40 each include an annular portion 41 having a generally circular periphery. The annular portion 41 has three through holes 41a, 42a, and 42b axially formed therethrough in a manner radially aligned to the rotation axis of the electromagnetic clutch.

The flange portion 11 of the hub 10 is generally circular in outer shape and has through holes 11a axially formed therethrough on an identical circumferential line at angular intervals of 120 degrees about the longitudinal or rotation axis of the drive shaft 2 (i.e. the rotation axis of the electromagnetic clutch).

The leaf springs 40 and the flange portion 11 are connected by rivets 14 extending respectively through corresponding ones of the through holes 42a of the leaf springs 40 and corresponding ones of the through holes 11a of the flange portion 11, whereby portions of the leaf springs 40 are fixed to the bottom or the rotor-side surface of the flange portion 11.

The leaf springs 40 and the third annular disk 30d are connected by rivets 15 extending respectively through corresponding ones of the through holes 41a of the leaf springs 40 and corresponding ones of the through holes 31d of the third annular disk 30d, which correspond in location to the outer disk 31 of the first annular disk 30a, whereby portions of the leaf springs 40 are fixed to the top or spring-side surface of the third annular disk 30d.

Rubber stoppers 50a to 50c are press-fitted into the through holes 42b of the leaf springs 40, respectively. The rubber stoppers 50a to 50c are in urging contact at respective one ends thereof with the top or spring-side surface of the third annular disk 30d such that they have preloads which prevent rattle from occurring between the armature plate 30 and the leaf springs 40.

Further, the first annular disk 30a and the second annular disk 30b are connected by the aforementioned rivets 16 extending through corresponding ones of the through holes 31a of the outer disk 31, corresponding ones of the through holes of the annular projections 30f, and corresponding ones of the through holes 31b of the second annular disk 30b, and the aforementioned rivets 17 extending through corresponding ones of the through holes 33a of the inner disk 33, corresponding ones of the through holes of the annular projections 30g, and corresponding ones of the through holes 33b of the second annular disk 30b, whereby the first annular disk 30a and the second annular disk 30b are secured to each other with the predetermined axial gap 30e provided therebetween.

According to the above construction of the electromagnetic clutch of the present embodiment, when the armature plate 30 is magnetically attracted into abutment with the rotor 20 when the magnetic coil 21 is energized, torque from the engine is transmitted to the first annular disk 30a, the rivets 16, 17, the second annular disk 30b, the elastic body 30c, the third annular disk 30d, the leaf springs 40, and the flange portion 11 of the hub 10, in the mentioned order, to cause rotation of the drive shaft 2 of the refrigerant compressor for driving the refrigerant compressor.

The armature plate 30 is constructed as a double disk device in such a manner that the outer and inner disks 31 and 33 of the first annular disk 30a are secured to the second annular disk 30b by the rivets 16 and 17, respectively, with the radial gap 32 provided therebetween, so that magnetic flux is prevented from leaking via the rotor 20 and the armature plate 30, which improves the attraction efficiency of the armature plate 30.

When there arises a variation in torque (reaction force) from the refrigerant compressor, the variation in the torque is accommodated first by elastic deformation of the elastic body 30c, and then the remainder, which was not accommodated by the elastic body 30c, is accommodated by elastic deformation or deflection of the leaf springs 40. Thus, the torque or reaction force from the compressor is reduced by both the elastic body 30c and the leaf springs 40, which makes it possible to decrease load or burden resulting from the variation in the torque, which is imposed on component parts (such as the leaf springs 40) of the electromagnetic clutch.

Figure 5:
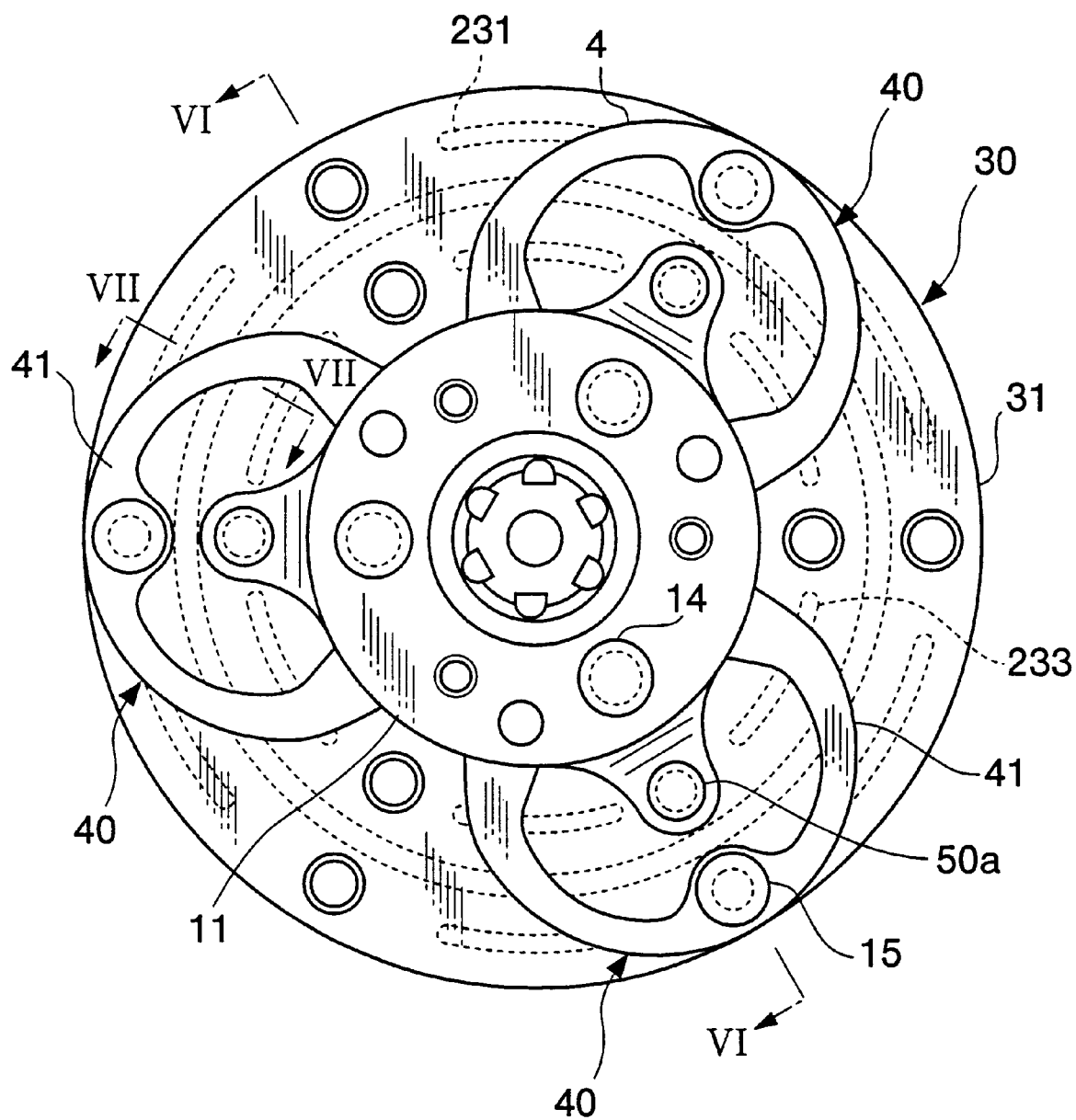
FIG. 5 is a plan view of an armature plate according to a variation of the first embodiment of the invention.

FIG. 5 is a plan view of an armature plate of an electromagnetic clutch according to a variation of the first embodiment of the invention. FIG. 6 is a view taken on line VI—VI of FIG. 5, and FIG. 7 a view taken on line VII—VII of the same. Component parts and elements corresponding to those of the first embodiment are designated by identical reference numerals, and description thereof is omitted.

This variation is distinguished from the first embodiment in that the second annular disk 30b has a plurality of arcuate slits 231, 233 axially formed therethrough at circumferentially-spaced intervals about the rotation axis thereof and that portions of the elastic body 30c extend respectively through the slits 231, 233 such that they slightly project from the second annular disk 30b into urging contact with the first annular disk 30a.

The present variation provides the same effects as obtained by the first embodiment. Further, since the elastic body 30c is always pressed against the first annular disk 30a, noise produced when the armature plate 30 is magnetically attracted into abutment with the rotor 20 is absorbed by the elastic body 30c having elasticity, whereby the noise is reduced.

Figure 8:
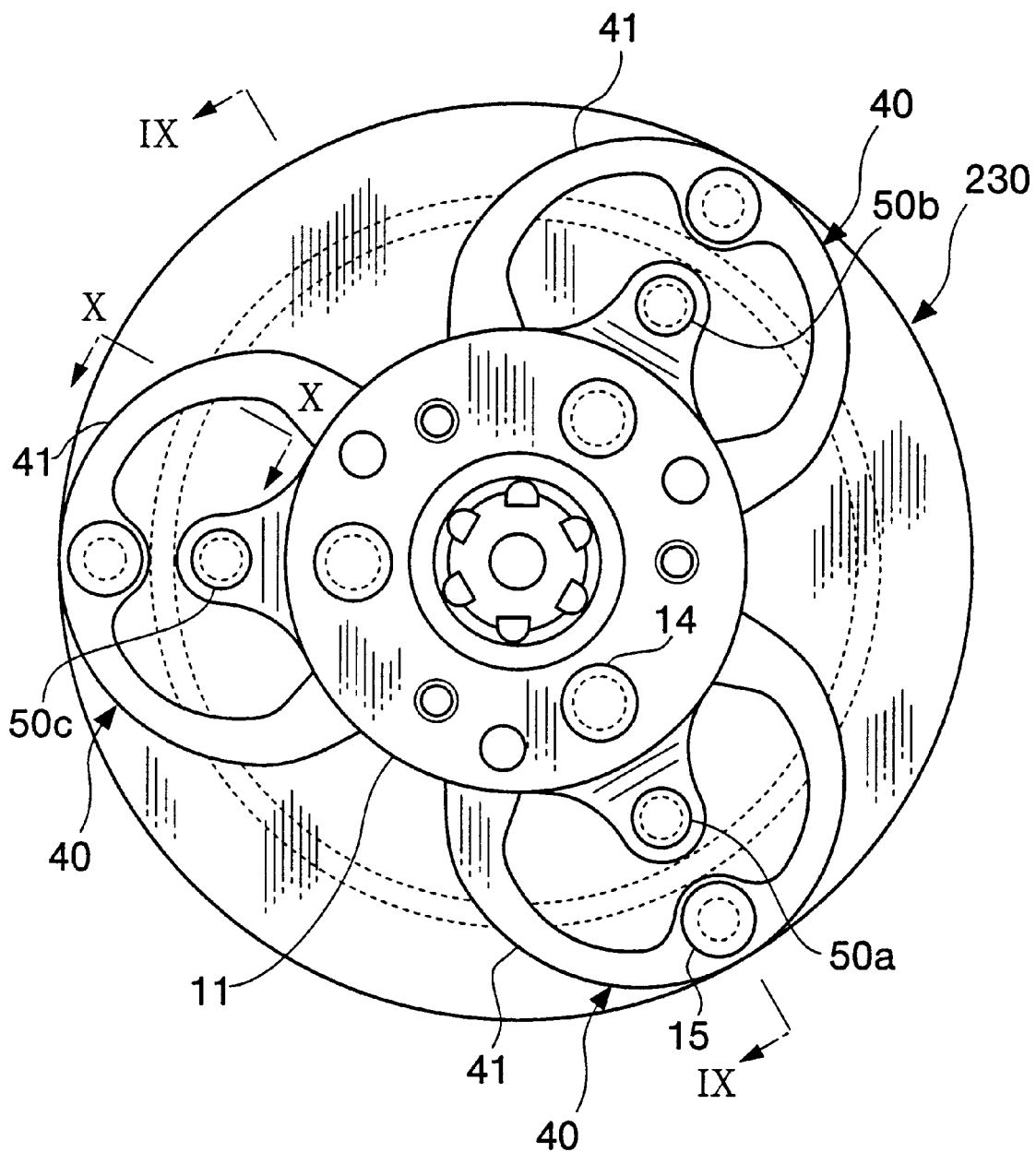
FIG. 8 is a plan view of an armature plate of an electromagnetic clutch according to a second embodiment of the invention.
Figure 9:
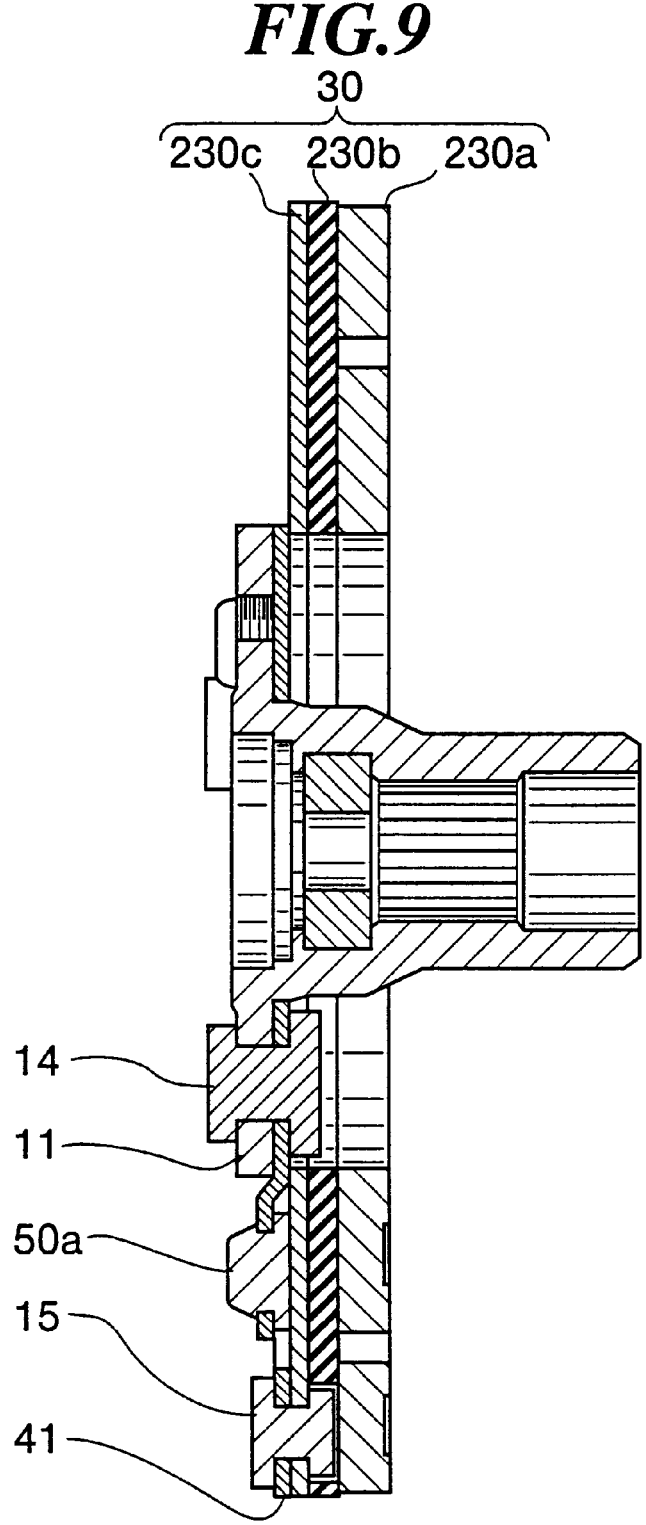
FIG. 9 is a cross-sectional view taken on line IX—IX of FIG. 8.
Figure 10:
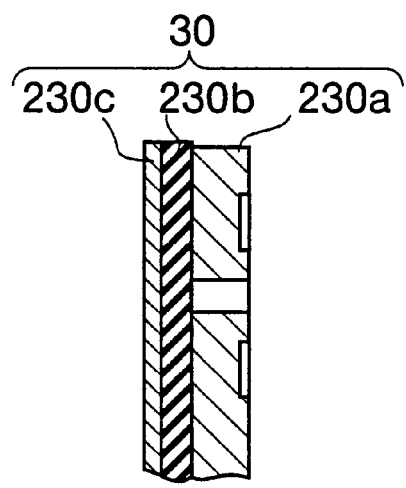
FIG. 10 is a cross-sectional view taken on line X—X of FIG. 8.

FIG. 8 is a plan view of an armature plate of an electromagnetic clutch according to a second embodiment of the invention. FIG. 9 is a view taken on line IX—IX of FIG. 8, and FIG. 10 a view taken on line X—X of the same. Component parts and elements corresponding to those of the first embodiment are designated by identical reference numerals, and description thereof is omitted.

According to this embodiment, the armature plate 230 is comprised of a rotor-side annular disk 230a axially opposed to the rotor 20 (see FIG. 2) with a predetermined axial gap therebetween, an elastic body 230b, and a spring-side annular disk 230c axially joined to the rotor-side annular disk 230a via the elastic body 230b.

The present embodiment is distinguished from the first embodiment, in which the second annular disk 30*b* is connected to the first annular disk 30*a* (equivalent to the rotor-side annular disk 230*a*) by the rivets 16, 17, in that the second annular disk 30*b* is dispensed with and that the elastic body 230*b* is bonded to the rotor-side annular disk 230*a* and the spring-side annular disk 230*c* by baking in a manner integrally sandwiched therebetween.

This embodiment provides the same effects as obtained by the first embodiment. Further, since the second annular disk 30*b* and the rivets 16, 17 are not used, it is possible to provide an electromagnetic clutch having a reduced axial length in comparison with the electromagnetic clutch according to the first embodiment.

It is further understood by those skilled in the art that the foregoing are preferred embodiments of the invention, and that various changes and modification may be made without departing from the spirit and scope thereof.

What is claimed is:

1. An electromagnetic clutch including a hub rigidly fitted on a drive shaft, said hub having a flange portion, a rotor which rotates about said drive shaft, a magnetic coil arranged in said rotor, an armature plate which is magnetically attracted into abutment with said rotor when said magnetic coil is energized, and a plurality of spring members interposed between said flange portion of said hub and said armature plate along a circumference of said rotor, for connection between said flange portion of paid hub and said armature plate, wherein said armature plate comprises:

a rotor-side annular disk axially opposed to said rotor with a predetermined axial gap therebetween;

a spring-side annular disk arranged on a sprint member side of said rotor-side annular disk in a manner axially opposed to said rotor-side annular disk; and an elastic body interposed between said rotor-side annular disk and said spring-side annular disk such that said elastic body is joined to said rotor-side annular disk and said spring-side annular disk, wherein said rotor-side annular disk comprises a first annular disk axially opposed to said rotor with said predetermined axial gap therebetween, and a second annular disk connected to said first annular disk in a manner axially opposed to said first annular disk with a predetermined axial gap therebetween, said elastic body being interposed between said second annular disk and said spring-side annular disk such that said elastic body is axially joined to said second annular disk and said spring-side annular disk.

2. An electromagnetic clutch according to claim 1, wherein said second annular disk has through holes axially formed therethrough at circumferentially-spaced intervals, through which respective portions of said elastic body are in contact with said first annular disk.

3. An electromagnetic clutch according to claim 1, wherein said first annular disk has projections formed on a second annular disk-side surface thereof for producing said predetermined axial gap between said first annular disk and said second annular disk.

4. An electromagnetic clutch according to claim 3, wherein said projections define therein through holes, respectively, which extend axially, said first annular disk and said second annular disk being connected by a plurality of rivets, said rivets extending through said through holes of said projections, respectively.

5. An electromagnetic clutch according to claim 1, wherein said elastic body is formed of rubber and joined to said second annular disk and said spring-side annular disk by vulcanizing adhesion.

6. An electromagnetic clutch according to claim 1, wherein said first annular disk comprises an outer disk, and an inner disk arranged radially inward of said outer disk with a predetermined radial gap therebetween.

* * * * *